US006933057B2

(12) United States Patent
Young et al.

(10) Patent No.: US 6,933,057 B2
(45) Date of Patent: Aug. 23, 2005

(54) FRICTION STIR WELDED ASSEMBLY AND METHOD OF FORMING A FRICTION STIR WELDED ASSEMBLY

(75) Inventors: Keith A. Young, St. Louis, MO (US); John A. Baumann, St. Charles, MO (US); Kevin G. Waymack, Hazelwood, MO (US)

(73) Assignee: The Boeing Company, Chicago, IL (US)

( * ) Notice: Subject to any disclaimer, the term of this patent is extended or adjusted under 35 U.S.C. 154(b) by 18 days.

(21) Appl. No.: 10/622,888

(22) Filed: Jul. 17, 2003

(65) Prior Publication Data

US 2004/0065716 A1 Apr. 8, 2004

(51) Int. Cl.[7] ............................................... B23K 31/02
(52) U.S. Cl. .................................... 428/593; 228/112.1
(58) Field of Search ............................. 228/112.1, 2.1; 428/593, 598, 654

(56) References Cited

U.S. PATENT DOCUMENTS

| 5,611,479 | A | | 3/1997 | Rosen |
| 5,697,511 | A | | 12/1997 | Bampton |
| 5,697,544 | A | | 12/1997 | Wykes |
| 5,713,507 | A | | 2/1998 | Holt et al. |
| 5,718,366 | A | | 2/1998 | Colligan |
| 5,769,306 | A | | 6/1998 | Colligan |
| 5,794,835 | A | | 8/1998 | Colligan et al. |
| 5,971,252 | A | | 10/1999 | Rosen et al. |
| 5,975,406 | A | | 11/1999 | Mahoney et al. |
| 6,045,027 | A | | 4/2000 | Rosen et al. |
| 6,045,028 | A | | 4/2000 | Martin et al. |
| 6,050,475 | A | | 4/2000 | Kinton et al. |
| 6,051,325 | A | | 4/2000 | Talwar et al. |
| 6,070,784 | A | | 6/2000 | Holt et al. |
| 6,138,895 | A | | 10/2000 | Oelgoetz et al. |
| 6,168,067 | B1 | | 1/2001 | Waldron et al. |
| 6,193,137 | B1 | * | 2/2001 | Ezumi et al. ............ 228/112.1 |
| 6,206,268 | B1 | | 3/2001 | Mahoney |
| 6,227,430 | B1 | | 5/2001 | Rosen et al. |
| 6,237,835 | B1 | | 5/2001 | Litwinski et al. |
| 6,257,479 | B1 | | 7/2001 | Litwinski et al. |
| 6,364,197 | B1 | | 4/2002 | Oelgoetz et al. |
| 6,367,681 | B1 | | 4/2002 | Waldron et al. |
| 6,398,883 | B1 | | 6/2002 | Forrest et al. |
| 6,421,578 | B1 | | 7/2002 | Adams et al. |
| 6,460,752 | B1 | | 10/2002 | Waldron et al. |
| 6,464,127 | B2 | | 10/2002 | Litwinski et al. |
| 6,484,924 | B1 | | 11/2002 | Forrest |
| 6,537,682 | B2 | * | 3/2003 | Colligan ..................... 428/593 |
| 6,676,008 | B1 | * | 1/2004 | Trapp et al. ............. 228/112.1 |
| 2001/0015369 | A1 | | 8/2001 | Litwinski et al. |
| 2002/0050508 | A1 | | 5/2002 | Yoshinaga |
| 2004/0025741 | A1 | * | 2/2004 | Aota et al. .................. 105/404 |
| 2004/0149807 | A1 | * | 8/2004 | Schilling et al. .......... 228/112.1 |

FOREIGN PATENT DOCUMENTS

| DE | 04076128.0 | 1/2005 |
| JP | 11010365 | 1/1999 |
| JP | 11081656 | 3/1999 |
| JP | 2000052065 | 2/2000 |
| JP | 2000176655 | 6/2000 |
| JP | 2001246482 | 9/2001 |
| JP | 2002-283069 | * 10/2002 |

* cited by examiner

*Primary Examiner*—Jonathan Johnson
(74) *Attorney, Agent, or Firm*—Thompson Coburn LLP

(57) ABSTRACT

A method of stir welding T-joints comprises assembling and stir welding first and second members. The first member comprises a sheet portion of material and also comprises restraining surfaces. The second member comprises a rib. The rib is stir welded to the sheet portion with the edge margin of the rib being positioned between the restraining surfaces of the first member. During stir welding, the restraining surfaces of the first member limit movement of the rib relative to the first member. A tooling portion is preferably formed as a contiguous portion of the material of one of the first and second members. The first and second members are secured to a stir welding apparatus via the tooling portion during the stir welding. The method yet further comprises a step of separating the tooling portion from the first and second members after forming the stir welded T-joint.

22 Claims, 4 Drawing Sheets

FRICTION STIR WELDED ASSEMBLY AND METHOD OF FORMING A FRICTION STIR WELDED ASSEMBLY

BACKGROUND OF THE INVENTION

This invention pertains to friction stir welding and friction stir welded assemblies. More particularly, this invention pertains to stir welded T-joints connecting relatively thin rib members to relatively thin sheet portions of material.

Friction stir welding provides advantages over other methods of welding. Perhaps the most significant advantage is that friction stir welds maintain a significant percentage of the strength associated with the material of the welded members. This allows for strong welded joints without requiring subsequent annealing and heat treating. Thus, in situations where an assembly cannot be annealed and/or heat treated friction stir welding may be the only acceptable method of welding such an assembly.

Despite these advantages, there are also several disadvantages associated with friction stir welding. One such disadvantage is that the stir welding tool utilized to form a stir weld exerts an appreciable amount of force against the assembly during the stir welding process. Thus, this force must be reacted by the assembly and the assembly must be sufficiently strong and rigid so as to avoid breakage and/or unacceptable deflection. Another disadvantage is that the movement of the stir welding tool relative to the components of the assembly can cause undesirable movement of the components relative to each other. Yet a further disadvantage is that relatively precise movement of the stir welding tool is required during welding and, as a result, this movement must generally be automated using complex machinery such as CNC vertical or multi-axis milling machines.

SUMMARY OF THE INVENTION

The present invention addresses some of the disadvantages associated with prior art stir welding techniques. In particular the present invention resolves problems associated with forming stir welded T-joints between relatively thin walled ribs and skin sheets. Additionally, the present invention addresses problems associated with the tooling required when forming a stir weld of such an assembly.

In a first aspect of the invention a method of stir welding T-joints comprises assembling a first member to a second member and stir welding the first member to the second member. The first member comprises a thin sheet portion of material having opposite first and second faces and also comprises opposing restraining surfaces that are oriented at an angle relative to the first face of the sheet portion. The second member comprises a rib that has a terminal edge margin. The assembling of the first member to the second member comprises engaging the edge margin of the rib of the second member with the first member in manner such that rib of the second member extends at an angle away from the first face of the first member and such that the edge margin is positioned between the restraining surfaces of the first member. The stir welding includes engaging a stir welding tool against the second face of the first member and occurs with the first and second members being assembled to each other as discussed above. During the stir welding, the restraining surfaces of the first member limit movement of the edge margin of the second member relative to the first member.

In another aspect of the invention, a method of stir welding comprises forming first and second members from material. One of the first and second members comprises a tooling portion formed as a contiguous portion of the material of the respective member. The first member comprises a thin sheet portion formed as a contiguous portion of the material of the first member and the second member comprises a rib formed as a contiguous portion of the material of the second member. The rib has a terminal edge margin. The method further comprises utilizing a stir welding apparatus to stir weld the edge margin of rib of the second member to the sheet portion of the first member in a manner forming a stir welded T-joint. The first and second members are secured to the stir welding apparatus via the tooling portion during the stir welding. The method yet further comprises a step of separating the tooling portion from the first and second members after forming the stir welded T-joint.

In yet another aspect of the invention, a T-joint comprises a rib member and a sheet member. The rib member has opposite first and second faces. The sheet member comprises a thin sheet portion of material having opposite first and second faces and also comprises at least two restraining surfaces that are oriented at an angle relative to the first face of the sheet portion. At least one of the restraining surfaces of the sheet member is engaged with the first face of the rib member and at least one of the restraining surfaces of the sheet member is engaged with the second face of the rib member. The sheet member is stir welded to the rib member.

While the principal advantages and features of the invention have been described above, additional features and advantages may be obtained by referring to the drawings and the detailed description of the embodiments, which follow.

Figure 1:
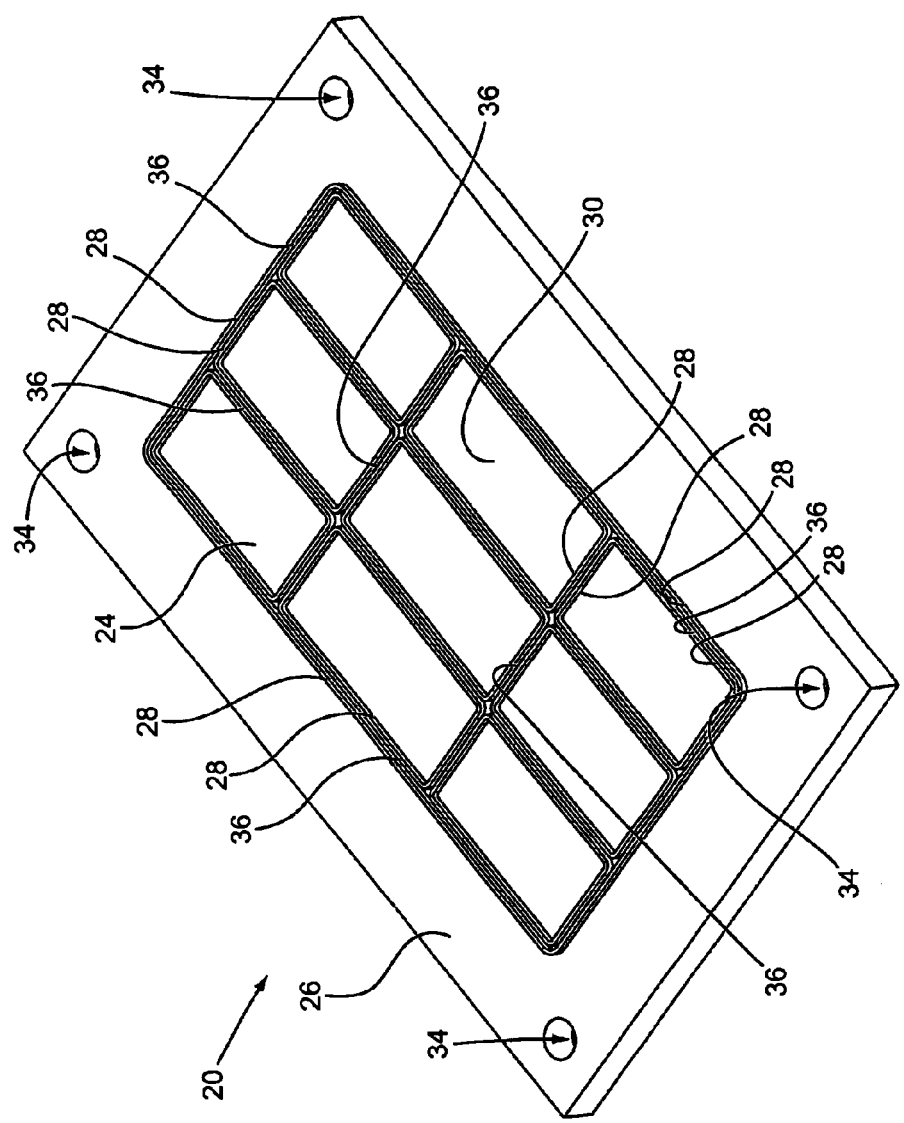
FIG. 1 is perspective view of a first member having a thin sheet portion in accordance with the invention.

Reference characters in the written specification indicate corresponding items shown throughout the drawing figures.

DETAILED DESCRIPTION OF THE PREFERRED EMBODIMENTS OF THE INVENTION

Figure 2:
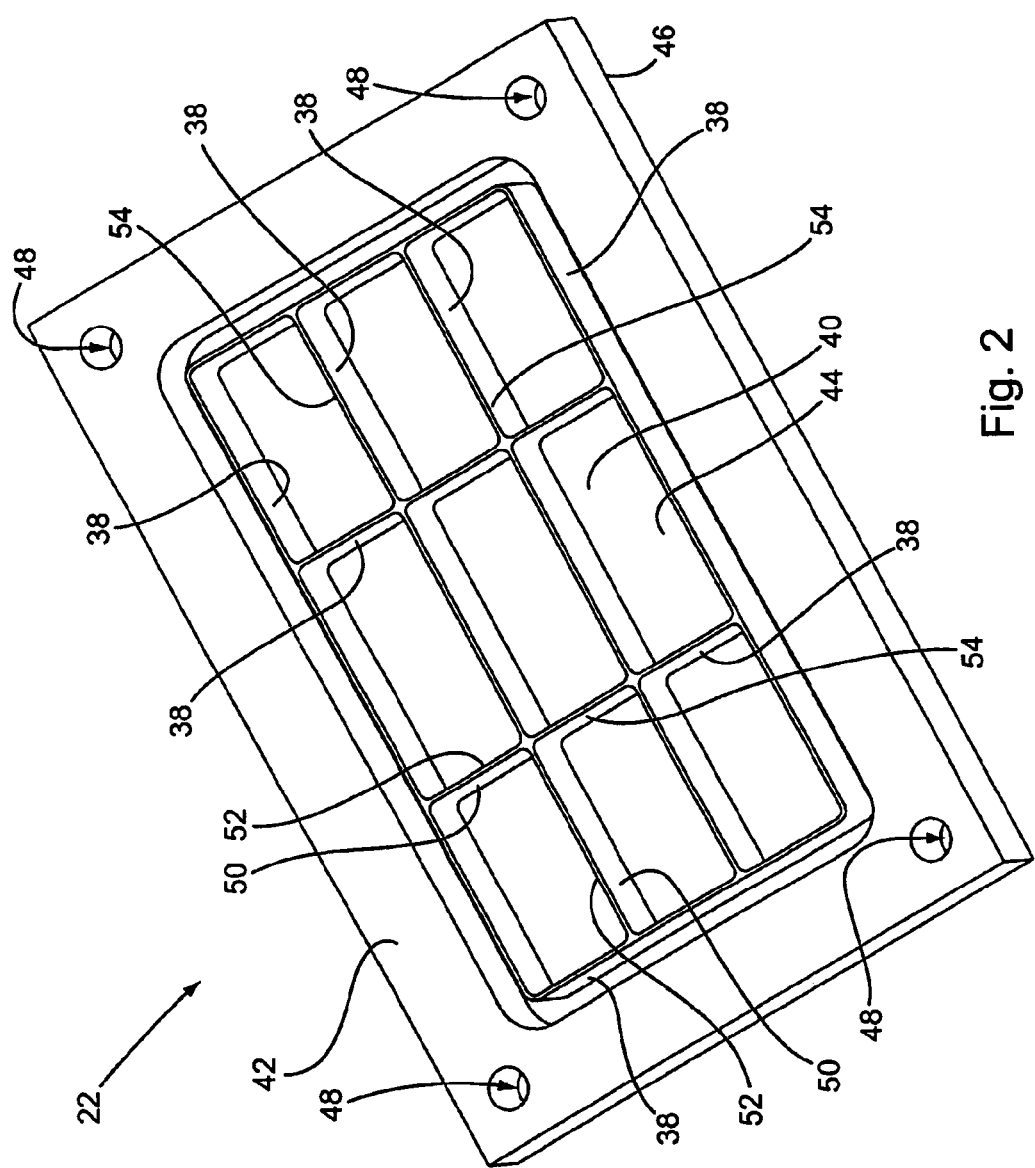
FIG. 2 is perspective view of a second member having a rib in accordance with the invention.

The preferred method of practicing the invention pertains to stir welding first and second members. The first member 20 and the second member 22 are shown independent of each other in FIGS. 1 and 2. Each of the first and second members 20,22 is preferably formed as a single monolithic piece of contiguous material. The material is preferably aluminum, although other materials suitable for stir welding, such as steel or plastic could be used in place of aluminum.

The first member 20 preferably comprises a sheet portion 24, a tooling portion 26, and a plurality of protuberances 28.

The sheet portion 24 of first member 20 is a generally thin walled structure having opposite first and second faces 30,32. The sheet portion 24 is also preferably planer. The tooling portion 26 preferably comprises a relatively rigid loop of material surrounding the sheet portion 24. The tooling portion 26 also preferably comprises a plurality of mounting holes 34 used for assembling and aligning the first and second members 20,22. The protuberances 28 are preferably elongate protrusions and are preferably rectangular in cross-section, as shown most clearly in FIG. 4. The protuberances 28 are preferably grouped in pairs and preferably extend perpendicularly from the first face 30 of the sheet portion 24. Each pair of protuberances 28 forms a groove 36 therebetween defined partially by opposing surfaces 37 of the protuberances.

The second member preferably comprises a plurality of ribs 38, a sheet portion 40, and a tooling portion 42. Like the first member 20, the sheet portion 40 of second member 22 is a generally thin walled structure having opposite first and second faces 44,46 and is also preferably planer. Also like the first member 20, the tooling portion 42 of the second member 22 preferably comprises a relatively rigid loop of material surrounding the sheet portion 40 and preferably comprises a plurality of mounting holes 48 used for the same purpose of assembling and aligning the first and second members 20,22. The ribs 38 of the second member 22 extend from the first face 44 of the sheet portion 40 and are preferably thin walled structures having opposite first and second faces 50,52. The ribs 38 are preferably rectangular in cross-section and preferably extend perpendicular to the sheet portion 40, eventually terminating at edge margins 54.

The first and second members 20,22 are preferably each machined from plate material using a high speed milling machine. However, it should be appreciated that other techniques such as molding could be used to form the first and second member 20,22. During the high speed machining, the mounting holes 34,48 of the tooling portion 26 of the respective member 20,22 are utilized to secure the members to the milling apparatus. The tooling portion 26,42 of each of the members is left appreciably robust in comparison to the remainder of the respective member so as to prevent excessive distortion of the thin walled structures during the milling and welding processes.

Figure 3:
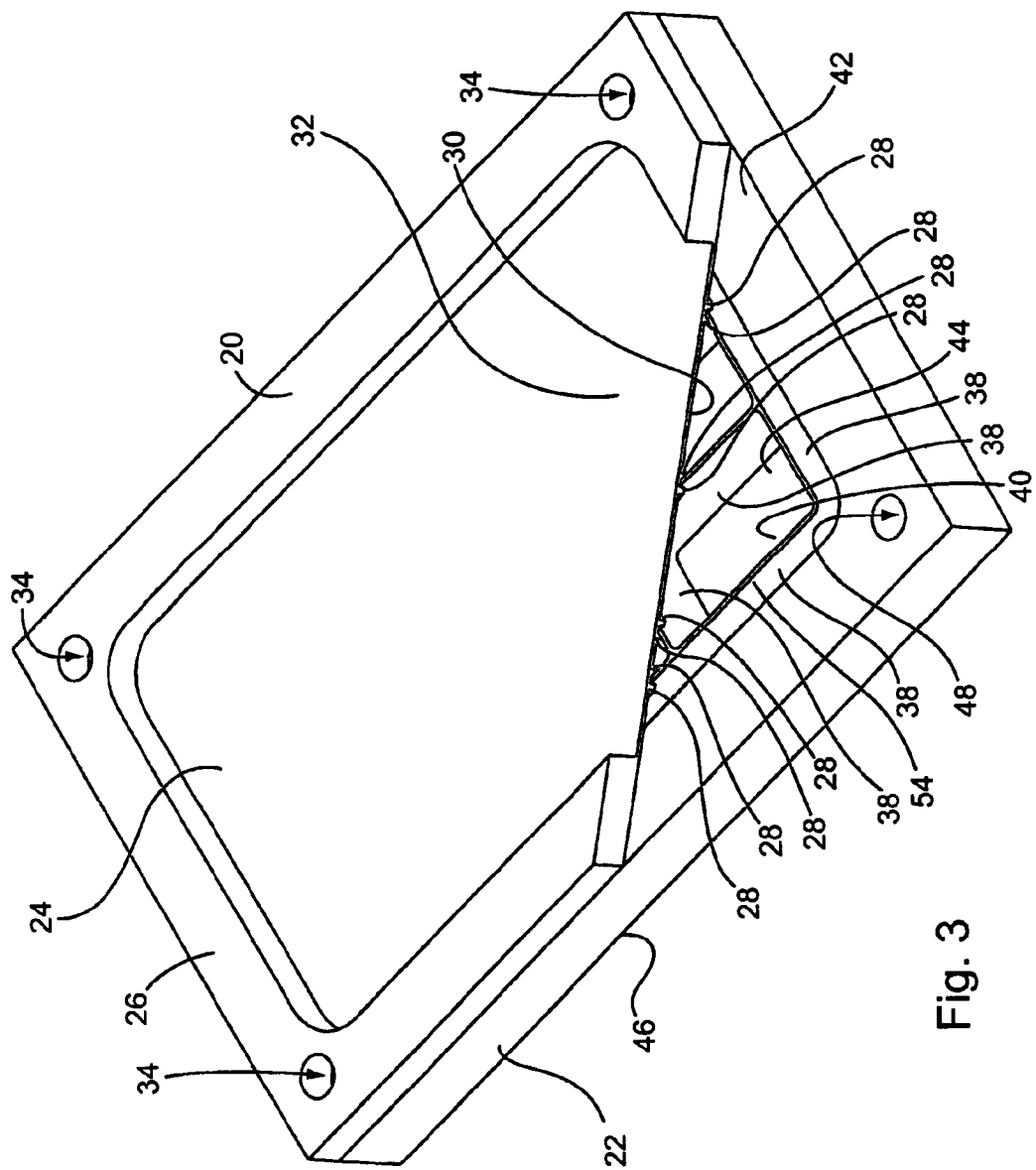
FIG. 3 is perspective view of the first member assembled to the second member in accordance with the invention and is shown with a portion of the first member removed for purposes of explaining the invention.
Figure 4:
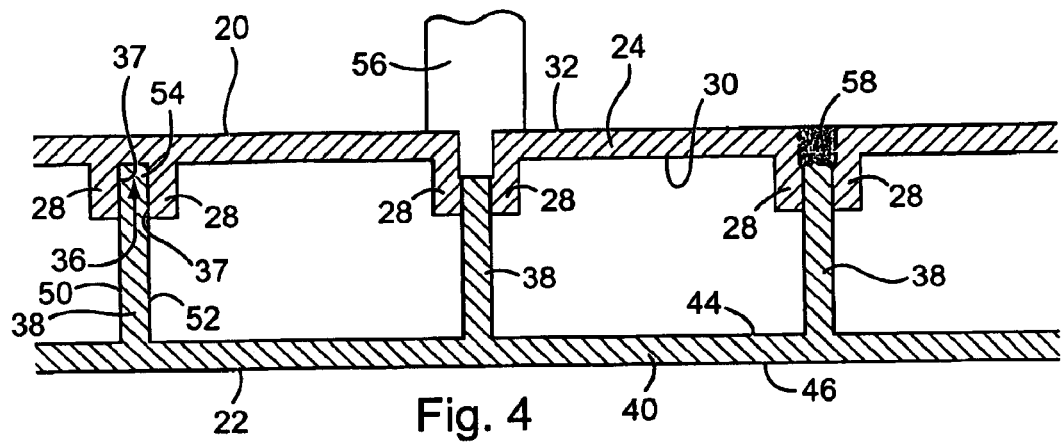
FIG. 4 is a partial cross-section view of the first and second members depicting the stir welding process.

After forming the first and second members 20,22, they are then assembled to each other as shown in FIGS. 3 and 4. The mounting holes 34,48 of the first and second members 20,22 facilitate the alignment of the members and also allow the members to be secured to each other and to a stir welding apparatus (not shown) using bolts extending therethrough. When assembled, the edge margin 54 of each rib 38 is positioned in one of the grooves 36 formed by the protuberances 28 of the first member 20. Each groove 36 is dimensioned to be equal to in width to, or only slightly wider than, the distance between the first and second faces 50,52 of the respective rib 38. Thus, it should be appreciated that the opposing surfaces 37 of the protuberances 28 forming the groove 36 act as restraining surfaces that can engage the rib 38 to prevent it from translating with respect to the first member 20 in a side-to-side manner (with reference to FIG. 4).

Figure 5:
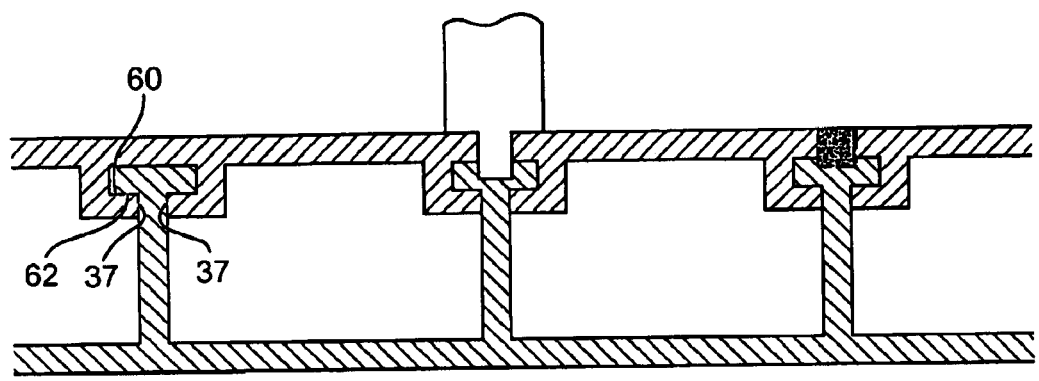
FIG. 5 is a partial cross-section view of an alternative embodiment of first and second members in accordance with the invention.
Figure 6:
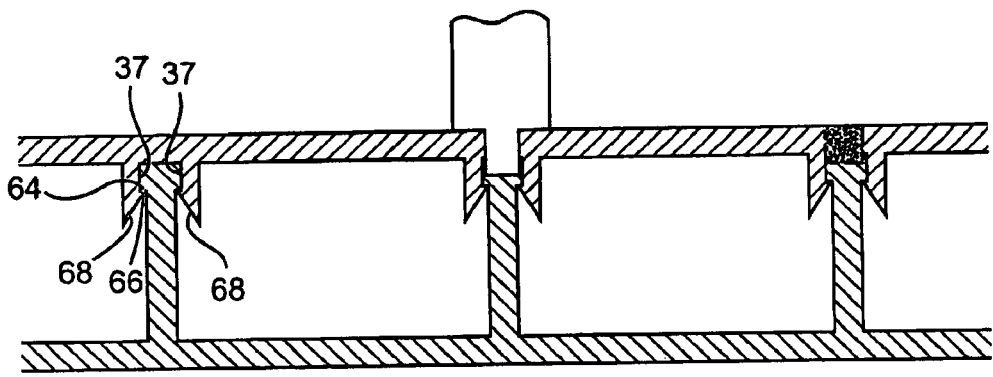
FIG. 6 is a partial cross-section view of yet another alternative embodiment of first and second members in accordance with the invention.

After the first and second members 20,22 have been assembled to each other and secured to a stir welding apparatus, they are then stir welded to each other. Preferably, the same milling machine used to form the first or second member 20,22 is utilized as the stir welding apparatus. To form a weld, a stir welding tool 56, shown schematically in FIGS. 4–6, is pressed against the second face 32 of the sheet portion 24 of the first member 20. During the welding, the stir welding tool 56 is rotated and moved in a manner such that it remains aligned with the grooves 36 and ribs 38. The tip of the stir welding tool 56 extends through the sheet portion 24 of the first member 20 where it engages with the edge margin 54 of the respective rib 38 (as depicted on the middle rib shown in FIG. 4). This causes the sheet portion 24 and also preferably the protuberances 28 of the first member 20 to fuse to the edge margin 54 of the rib 38, thereby forming a stir weld 58 (as depicted on the right most rib in FIG. 4). During this process of welding the ribs 38 to the first member 20, the protuberances 28 prevent the ribs from deflecting away from the stir welding 56 tool, as would otherwise likely occur. Thus, it should be appreciated that no additional tooling is required to maintain the relative position between the ribs 38 and the first member 20 during the stir welding process. Moreover, the tooling portions 26,42 of the first and second members 20,22 rigidly secure the members to each other and to the stir welding apparatus, thereby eliminating the need for additional tooling for such purposes.

After the stir welding has been completed, the tooling portions 26,42 of the first and second members 20,22 are separated from the welded assembly. This is preferably done using a cutting tool provided on the same milling machine used to perform the stir welding. Once this is done, the assembly is complete.

FIG. 5 depicts an alternative embodiment of the first and second members. In general, this embodiment has the same features as described in reference to the embodiment shown in FIGS. 1–4. However, the protuberances of the first member and the edge margins of the ribs of the second member have a different configuration that is configured to further secure the first and second members to each other during the stir welding operation. Basically, rather than being rectangular in cross-section, the edge margins of the ribs are T-shaped, as are the grooves formed by the protuberances. This results in the formation of locking surfaces 60 on the protuberances and locking surfaces 62 on the ribs that cooperate in a manner preventing the first member from moving vertically (as shown) away from the second member. It should be appreciated that this embodiment requires first and second members to be configured in a manner such that the ribs of the second member can be slid into the grooves of the first member during the initial assembly of the first and second members to each other. Thus, it is assumed that the grooves of this embodiment are all parallel to each other and that the grooves are open at one end to allow for the insertion and sliding of the ribs thereinto.

FIG. 6 depicts yet another alternative embodiment of the first and second members. Like the embodiment shown in FIG. 5, the grooves of the first member and the ribs of the second member have T-shaped cross-sections. Thus again, locking surfaces 64 on the protuberances and locking surfaces 68 on the ribs 38 are formed that cooperate in a manner preventing the first member from moving vertically (as shown) away from the second member. However, the protuberances of this embodiment are also shaped to include camming surfaces 68. The camming surfaces 68 are angled with respect to the first face of the sheet portion of the first member. Each protuberance of a pair of protuberances forming a groove has such a camming surface 68 that converges toward the camming surface of the other of the pair of protuberances as they extend toward the sheet portion of the first member. The camming surfaces 68 are configured to allow the first and second members to be initially assembled to each other by snapping the ribs (vertically as shown) into the grooves. As a rib is inserted into a groove, the edge margin of the rib engages the camming surfaces 68 which, due to their angled configuration, creates a force acting to spread the protuberances associated with the groove apart. The protuberances are formed to be resiliently deflectable such that the protuberances can spread apart enough to allow the T-shaped edge margin of the rib to pass therebetween and such that the protuberances will move back toward each other once the locking surfaces 66 of the rib pass the locking surfaces 64 of the protuberances. Thus, unlike the embodiment shown in FIG. 5, the ribs of the second member need not all be parallel. It should also be appreciated that, assuming the ribs are not parallel, the first member will be fully restrained with respect to the second member upon snapping the ribs into the grooves. Thus, tooling is not necessarily required to further secure the first or second members together during the sir welding operation.

Although the invention has been described in sufficient detail to allow others to practice the present invention, it should be understood that all matter contained in the above description or shown in the accompanying drawings is intended to be interpreted as illustrative and not in a limiting sense and that various modifications and variations of the device and methods may be employed without departing from the scope of the invention defined by the following claims. For example, it should be appreciated that not all steps of the preferred method of practicing the invention are necessarily required by each claim. Thus, with variations and modifications, other methods and devices in accordance with the invention should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Similarly, to the extent the term "portion" is used in the claims or is added by amendment, such term should be construed as meaning some or all of the item or element that it qualifies.

What is claimed is:

1. A method of stir welding T-joints comprising:
    assembling a first member to a second member, the first member comprising a thin sheet portion of material and at least two protuberances, the thin sheet portion of material having opposite first and second faces, the at least two protuberances extending outwardly from the first face of the sheet portion and together forming opposing restraining surfaces that are oriented at an angle relative to the first face of the sheet portion, the second member comprising a rib that has a terminal edge margin, the assembling comprising engaging the edge margin of the rib of the second member with the first member in manner such that the rib of the second member extends at an angle away from the first face of the first member and such that the edge margin is positioned between the restraining surfaces of the first member; and
    stir welding the first member to the second member by engaging a stir welding tool against the second face of the first member, the stir welding occurring with the first and second members being assembled to each other in accordance with the preceding step of assembling the first member to the second member, the restraining surfaces of the first member limiting movement of the edge margin of the second member relative to the first member during the stir welding.

2. A method in accordance with claim 1 wherein the first and second members are each formed as a single monolithic piece of contiguous material and wherein one of the first and second members comprises a tooling portion forming a portion of the monolithic piece thereof, the method further comprising securing the first and second members to a stir welding apparatus via the tooling portion during the step of stir welding the first member to the second member, and separating the tooling portion from the first and second members after stir welding the first member to the second member.

3. A method in accordance with claim 2 wherein the tooling portion forms a portion of the monolithic piece of the second member and forms a loop around the rib of the second member prior to being separated from the first and second members.

4. A method in accordance with claim 2 wherein the tooling portion constitutes a first tooling portion forming a portion of the monolithic piece of the one of the first and second members, and wherein the other of the first and second members comprises a second tooling portion forming a portion of the monolithic piece thereof, the method further comprising securing the first and second members to each other via the first and second tooling portions during the step of stir welding the first member to the second member, and separating the second tooling portion from the first and second members after stir welding the first member to the second member.

5. A method in accordance with claim 1 wherein the restraining surfaces of the first member extend parallel to each other and form a groove therebetween, and wherein the step of assembling further comprises inserting the edge margin of the rib of the second member into the groove of the first member.

6. A method in accordance with claim 5 wherein the first member further comprises a pair of locking surfaces that oppose the first face of the sheet portion of the first member, the restraining surfaces of first member being positioned between the locking surfaces and the first face, and wherein the rib has opposite first and second faces and the edge margin of the rib comprises a pair of locking surfaces, the first and second faces of the rib being positioned between the locking surfaces of the rib, and yet further wherein the step of assembling further comprises engaging the locking surfaces of the first member with the locking surfaces of the second member in a manner limiting the movement of the rib away from the first face of the first member.

7. A method in accordance with claim 6 wherein the step of assembling further comprises resiliently deflecting the locking surfaces of the first member away from each other as the edge margin of the rib of the second member is inserted into the groove of the first member, and allowing the locking surfaces of the first member to resiliently move toward each other in a manner such that the locking surfaces of the rib of the second member are positioned between the locking surfaces of the first member and the sheet portion of the first member.

8. A method of stir welding comprising:
    forming first and second members from material, one of the first and second members comprising a tooling portion formed as a contiguous portion of the material of the respective member, the first member comprising a thin sheet portion formed as a contiguous portion of the material of the first member, the second member comprising a rib formed as a contiguous portion of the material of the second member, the rib having a terminal edge margin;

utilizing a stir welding apparatus to stir weld the edge margin of rib of the second member to the sheet portion of the first member in a manner forming a stir welded T-joint, the first and second members being secured to the stir welding apparatus via the tooling portion during the stir welding; and separating the tooling portion from the first and second members after forming the stir welded T-joint.

9. A method in accordance with claim 8 wherein the forming of the first member occurs in a manner such that the sheet portion of the first member has opposite first and second faces and the first member further comprises opposing restraining surfaces that are oriented at an angle relative to the first face of the sheet portion, and wherein the step of utilizing the stir welding apparatus to stir weld the edge margin of rib of the second member to the sheet portion further comprises positioning the edge margin of the rib between the restraining surfaces of the first member in a manner such that the restraining surfaces limit relative movement between the rib and the sheet portion.

10. A method in accordance with claim 9 wherein the opposing restraining surfaces of the first member extended parallel to each other and form a groove therebetween, and wherein the step of utilizing the stir welding apparatus to stir weld the edge margin of rib of the second member to the sheet portion further comprises inserting the edge margin of the rib of the second member into the groove of the first member.

11. A method in accordance with claim 10 wherein the step of forming first and second members further comprises forming a pair of locking surfaces on the first member that oppose the first face of the sheet portion, the restraining surfaces of first member being positioned between the locking surfaces and the first face, and wherein the rib is formed with opposite first and second faces and a pair of locking surfaces on the edge margin thereof, the first and second faces of the rib being positioned between the locking surfaces of the rib, and yet further wherein the step of utilizing the stir welding apparatus to stir weld the edge margin of rib of the second member to the sheet portion of the first member further comprises engaging the locking surfaces of the first member with the locking surfaces of the second member in a manner limiting the movement of the rib away from the first face of the first member.

12. A method in accordance with claim 11 wherein the step of utilizing the stir welding apparatus to stir weld the edge margin of rib of the second member to the sheet portion of the first member further comprises resiliently deflecting the locking surfaces of the first member away from each other as the edge margin of the rib of the second member is inserted into the groove of the first member, and allowing the locking surfaces of the first member to resiliently move toward each other in a manner such that the locking surfaces at the rib of the second member are positioned between the locking surfaces of the first member and the sheet portion of the first member.

13. A method in accordance with claim 8 wherein the tooling portion forms a loop around the rib of the second member prior to being separated from the first and second members.

14. A method in accordance with claim 8 wherein the tooling portion constitutes a first tooling portion of the one of the first and second members, and wherein the other of the first and second members comprises a second tooling portion forming a contiguous portion of the material thereof, the method further comprising securing the first and second members to each other via the first and second tooling portions during the step of utilizing the stir welding apparatus to stir weld the edge margin of rib of the second member to the sheet portion of the first member, and separating the second tooling portion from the first and second members after forming the stir welded T-joint.

15. A method in accordance with claim 14 further comprising a step of aligning the first a second members with respect to each other via the first and second tooling portions.

16. A T-joint comprising:

a rib member having opposite first and second faces; and a sheet member, the sheet member comprising a thin sheet portion of material having opposite first and second faces and also comprising at least two restraining surfaces that are oriented at an angle relative to the first face of the sheet portion, at least one of the restraining surfaces of the sheet member being engaged with the first face of the rib member and at least one of the restraining surfaces of the sheet member being engaged with the second face of the rib member, the sheet member being stir welded to the rib member.

17. A T-joint in accordance with claim 16 wherein the opposing restraining surfaces of the sheet member extend parallel to each other and form a groove therebetween, and wherein a portion of the rib member is positioned within the groove.

18. A T-joint in accordance with claim 16 wherein the sheet member further comprises a pair of locking surfaces that oppose the first face of the sheet portion, the restraining surfaces of the sheet member being positioned between the locking surfaces and the first face of the sheet member, and wherein the rib member comprises a pair of locking surfaces, the locking surfaces of the rib member being positioned between the locking surfaces of the sheet member and the first face of the sheet member.

19. A T-joint in accordance with claim 18 wherein the sheet member further comprises a pair of camming surfaces, each of the locking surfaces of the sheet member being positioned between one of the camming surfaces and the sheet portion, the camming surfaces being oriented in a manner such that the camming surfaces converge toward each other as they extend toward the sheet portion of the sheet member.

20. A T-joint in accordance with claim 16 wherein the rib member extends perpendicular relative to the first face of the sheet portion of the sheet member.

21. A method in accordance with claim 9 wherein the forming of the first member occurs in a manner such that the first member comprises at least two protuberances that extend outwardly from the first face of the sheet portion and that together form the opposing restraining surfaces.

22. A T-joint in accordance with claim 16 wherein the sheet member comprises at least two protuberances, and the at least two protuberances extend outwardly from the first face of the sheet portion and together form the restraining surfaces.

* * * * *